Figures 1, 2:
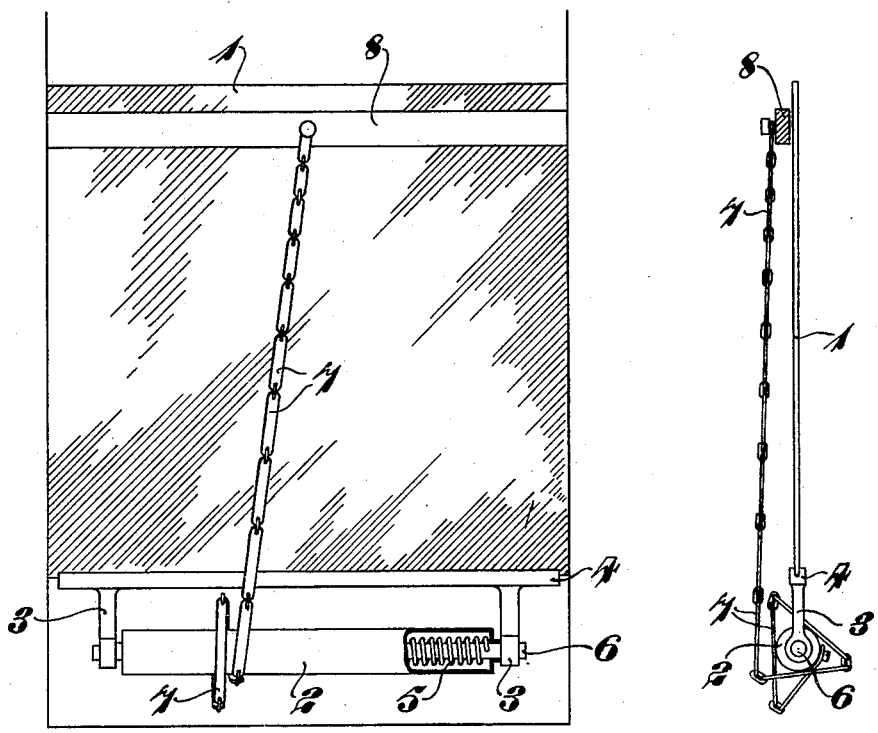

Dec. 1, 1931. H. R. WEBB ET AL 1,834,661
DEVICE FOR BALANCING BODIES CAPABLE OF A RISING AND FALLING MOVEMENT

Original Filed June 8, 1929

INVENTORS
H. R. Webb,
H. N. Webb
BY Barker & Collings
ATTORNEYS

Patented Dec. 1, 1931

1,834,661

UNITED STATES PATENT OFFICE

HARRY RILEY WEBB AND HARRY NEWTON WEBB, OF GRANTHAM, ENGLAND

DEVICE FOR BALANCING BODIES CAPABLE OF A RISING AND FALLING MOVEMENT

Original application filed June 8, 1929, Serial No. 369,477, and in Great Britain February 5, 1929. Divided and this application filed June 14, 1930. Serial No. 461,244.

This invention comprises an improved device for balancing bodies capable of a rising and falling movement. In the specification of our co-pending application for patent, Serial No. 369,477, filed June 8, 1929, of which the application of this case is a division means have been described whereby a body may be balanced at successive positions throughout the range of its movement, said means comprising, in one instance, a chain adapted to be wound onto or from a rotatable spring-influenced drum, the positions taken up by the chain links on passing onto or from said drum causing a cyclic variation in the moments of the forces applied to the drum by the weight of the body to be balanced.

The principal object of the present invention is to provide means whereby a compensating effect may be obtained in respect of the forces exerted by the balancing means at different positions in the movement of the body, in addition to the above referred to periodic or cyclic variations in the moments of the force applied to the balancing means by the weight of the body.

A further object is to do away with the necessity of independent locking mechanism in connection with displaceable bodies and to provide means whereby the body to be balanced may be moved to the desired position whereupon, if necessary, an automatic movement takes place to such position that equilibrium between the opposing forces is attained.

A still further object of the present invention is to provide means of a simple and cheaply constructed nature functioning to maintain an effective balance at successive and separated positions throughout the range of movement of the body.

Further objects are attained by the novel construction and arrangement of the parts forming the subject of the present invention, which objects will be more fully apparent after consideration of the accompanying specification in connection with the attached drawings wherein:—

Fig. 1 represents a diagrammatic elevation of a traversable window incorporating balancing mechanism in accordance with the present invention and, Fig. 2 is an end view of Fig. 1.

The attached drawings represent by way of example the application of a balancing device to a movable window such for example as those employed in automobiles although the invention is not to be regarded as limited to this purpose.

Below the window 1 is provided a rotatable drum or roller 2 actuated in one direction by means of an internal spring 5 connected therewith at one end, said spring being mounted on, and attached at the other end to a central stationary spindle 6 mounted in bearing brackets 3 carried on a channel member 4 associated with the lower edge of the window. The spring influenced drum 2 is, in this manner made displaceable with the window 1 to be balanced.

A chain or the like 7 is secured to the outer face of the drum in any suitable manner and is adapted to be wound on to or from said drum on displacement of the window; the opposite end of such chain being connected to a pin or the like on a stationary cross-bar or member 8 disposed above the drum 2, the arrangement being such that when the window 1 is in its uppermost position the chain is wound to its maximum extent on to the drum 2.

The opposed forces, comprising the balancing spring 5 and that due to the weight of the balanced body 1, are thus applied to the opposite ends of the chain 7 and by virtue of the chain being connected with a stationary part 8 the lifting or balancing force is applied to the body 1. As the successive chain links pass onto or from the drum 2 such links take up various angular dispositions thereon the effect of which is to cause a cyclic variation in the moments of the forces applied to the internal spring 5 by the weight of the window 1. The effective balancing force lies between the upper and lower limits of the cyclic variation and thus equilibrium between the opposing forces may be attained during each phase of the cyclic variation.

The links of the chain 7 are as shown of progressively increasing length and it will be evident from a consideration of Fig. 2 that as the chain is wound on to and from the drum 2 chain links of continually varying length are brought into action which cause an additional variation of a non-cyclic nature, in the moments of the forces applied to spring 5 by the weight of the body to be balanced to be superimposed on the said cyclic variation. The effect produced by this arrangement comprises a cyclic variation in the moments of the forces applied to the balancing force having progressively varying upper and lower limits.

By suitably proportioning the size of the chain links the non-cyclic variation of the upper and lower limits of the force-moments applied to the balancing force may be such as to compensate for the increasing balancing force of the spring 5 as same becomes more highly tensioned. Undesired movements of the window 1 on account of vibration and other disturbing influences is however, effectively prevented by the balancing force of the spring lying between the limits of the cyclic variation applied thereto by the weight of the body to be balanced; thus it is improbable that vibrational influences would so affect the force exerted by the window, either by adding thereto or by subtracting therefrom, as to cause displacement of such window. On the other hand, the parts are so proportioned that when it is desired to adjust the position of the window same may be easily moved by hand to the desired position, a slight movement subsequently taking place, if necessary in order that a position of balance may be reached.

Claims:

1. A device for balancing bodies adapted for a rising and falling movement by balancing means exerting an inconstant balancing force comprising a chain having links of progressively increasing length, means for applying the balancing force and the weight of the body to be balanced to the opposite ends of said chain and means whereby on displacement of the body said chain is passed progressively over a smooth element.

2. A device for balancing bodies adapted for a rising and falling movement by balancing means exerting an inconstant balancing force comprising a chain having links of progressively increasing length, means for applying the opposed forces to the opposite ends of said chain and means for passing said chain over a smooth element on displacement of the body, the position taken up by the links of said chain around the smooth element applying a combined cyclic and a progressive non-cyclic variation in the moments of the forces applied to the balancing means by the weight of the body to be balanced.

3. A device for balancing bodies adapted for a rising and falling movement by balancing means exerting an inconstant balancing force comprising a chain having links of progressively increasing length, a spring actuated drum onto which the said chain may be progressively wound, means for applying the weight of the body, to be balanced on one end of said chain and the position taken up by said chain links around said spring actuated drum causing a cyclic variation in the moments of the forces applied to the balancing means by the weight of the body to be balanced.

4. A device for balancing bodies adapted for a rising and falling movement by balancing means exerting an inconstant balancing force comprising a chain having links of progressively increasing length, a spring actuated drum onto which said chain may be wound on displacement of the body and a relatively stationary attachment above said spring actuated drum to which the free end of such chain is connected, the positions taken up by said chain links around said spring drum causing a combined cyclic and progressive non-cyclic variation in the moments of the forces applied to the balancing spring by the weight of the body to be balanced.

5. A device for balancing bodies adapted for a rising and falling movement by balancing means exerting an inconstant balancing force comprising a chain having links of progressively increasing length, a rotatable drum below the body to be balanced and displaceable therewith, a spring mounted interiorly of said drum and connected at one end thereto and at the other end to a non-rotatable support for said drum whereby a rotational force may be imparted to said drum, means for securing one end of said chain to the outer surface of said drum whereby on displacement of the body said chain is wound onto said drum and a stationary point above said drum to which the free end of said chain is secured, the positions taken up by the chain links around said drum causing a combined cyclic and a progressive non-cyclic variation in the moments of the forces applied to the balancing spring by the weight of the body to be balanced.

6. A device for balancing bodies adapted for a rising and falling movement by balancing means exerting an inconstant balancing force comprising a chain having links of progressively increasing length, a spring actuated drum onto which the said chain may be progressively wound, means for applying the weight of the body to be balanced on one end of said chain and the position taken up by said chain links around said spring actuated drum causing a cyclic variation in the moments of the forces applied to the balancing means by the weight of the body to be balanced, and the effective balancing force exerted by the balancing means always lying intermediate the upper and lower limits of such cyclic variation.

7. A device for balancing bodies adapted for a rising and falling movement by balancing means exerting an inconstant balancing force comprising a chain having links of progressively increasing length, a rotatable drum below the body to be balanced and displaceable therewith, a spring mounted interiorly of said drum and connected at one end thereto and at the other end to a non-rotatable support for said drum whereby on displacement of the body said chain is wound onto said drum and a stationary point above said drum to which the free end of said chain is secured, the positions taken up by the chain links around said drum causing a combined cyclic and a progressive non-cyclic variation in the moments of the forces applied to the balancing spring by the weight of the body to be balanced, and the effective balancing force exerted by the spring always lying intermediate the upper and lower limits of such cyclic variation.

HARRY RILEY WEBB.
HARRY NEWTON WEBB.